(12) United States Patent
Hsieh

(10) Patent No.: US 12,454,038 B2
(45) Date of Patent: Oct. 28, 2025

(54) ELASTIC ELEMENT AND HAND TOOL INCLUDING THE SAME

(71) Applicant: KABO Tool Company, Taichung (TW)

(72) Inventor: Chih-Ching Hsieh, Taichung (TW)

(73) Assignee: KABO Tool Company, Taichung (TW)

( * ) Notice: Subject to any disclaimer, the term of this patent is extended or adjusted under 35 U.S.C. 154(b) by 382 days.

(21) Appl. No.: 18/313,123

(22) Filed: May 5, 2023

(65) Prior Publication Data

US 2023/0364754 A1 Nov. 16, 2023

(30) Foreign Application Priority Data

May 11, 2022 (TW) .................... 111117702

(51) Int. Cl.
*B25B 23/10* (2006.01)
*B25B 13/06* (2006.01)

(52) U.S. Cl.
CPC .......... *B25B 23/108* (2013.01); *B25B 13/065* (2013.01)

(58) Field of Classification Search
CPC .... F16J 15/3232; F16J 15/3236; B25B 13/06; B25B 13/065; B25B 23/108; B25B 23/10; B25B 23/105
USPC ................................................. 227/395, 628
See application file for complete search history.

(56) References Cited

U.S. PATENT DOCUMENTS

| | | | | |
|---|---|---|---|---|
| 2,491,089 A * | 12/1949 | Cowden | ................ | B25B 23/108 |
| | | | | 81/125 |
| 2,521,248 A * | 9/1950 | Parker | ..................... | F16J 15/32 |
| | | | | D25/119 |
| 2,590,759 A * | 3/1952 | Dale | ........................ | F16J 15/38 |
| | | | | 277/395 |
| 2,877,071 A * | 3/1959 | Arnot | ........................ | F16J 9/28 |
| | | | | 277/589 |
| 3,192,942 A * | 7/1965 | Manor | ................... | F16K 41/046 |
| | | | | 277/377 |
| 3,519,280 A * | 7/1970 | Genz | ........................ | F16J 15/20 |
| | | | | 277/560 |
| 3,594,549 A * | 7/1971 | Frank | .................... | G06K 13/073 |
| | | | | 271/111 |
| 3,834,253 A * | 9/1974 | Carr | ...................... | B25B 23/108 |
| | | | | 81/125 |
| 3,921,991 A * | 11/1975 | Beck | ..................... | F16J 15/3236 |
| | | | | 251/214 |
| 4,201,393 A * | 5/1980 | Kawashima | ............ | F16G 13/06 |
| | | | | 277/395 |
| 4,223,896 A * | 9/1980 | Strom | ..................... | F16L 21/03 |
| | | | | 285/345 |
| 4,241,927 A * | 12/1980 | Wiese | ..................... | F16J 15/38 |
| | | | | 277/395 |

(Continued)

*Primary Examiner* — David B. Thomas
(74) *Attorney, Agent, or Firm* — Wang Law Firm, Inc.

(57) ABSTRACT

An elastic element includes an inner annular wall, at least one outer annular wall, and a groove. The at least one outer annular wall connects with the inner annular wall and surrounds the inner annular wall. The groove is formed between the inner annular wall and the at least one outer annular wall. The structural designs of the inner annular wall, the at least one outer annular wall, and the groove are such that when the elastic element is applied to a hand tool, the groove provides a space that allows the inner annular wall to be deformed, making it easier for a user to fit a to-be-operated object securely in the hand tool to enhance work efficiency.

8 Claims, 9 Drawing Sheets

(56) References Cited

U.S. PATENT DOCUMENTS

| | | | | |
|---|---|---|---|---|
| 4,618,154 | A * | 10/1986 | Freudenthal | F16J 15/3236 |
| | | | | 277/556 |
| 5,312,116 | A * | 5/1994 | Quaglia | F16J 15/164 |
| | | | | 277/910 |
| 5,533,970 | A * | 7/1996 | Berger | A61M 5/322 |
| | | | | 604/110 |
| 5,685,548 | A * | 11/1997 | Casemir | F16G 13/06 |
| | | | | 277/395 |
| 5,813,674 | A * | 9/1998 | Dickie | F16J 15/3476 |
| | | | | 277/390 |
| 5,947,320 | A * | 9/1999 | Bordner | B65D 47/121 |
| | | | | 220/803 |
| 6,161,841 | A * | 12/2000 | Shaw | F16J 15/025 |
| | | | | 277/944 |
| 6,170,363 | B1 * | 1/2001 | Hu | B25B 23/108 |
| | | | | 81/125 |
| 6,776,422 | B1 * | 8/2004 | Toy | F16J 15/025 |
| | | | | 277/910 |
| 7,017,457 | B2 * | 3/2006 | Nessbaum | B25B 23/108 |
| | | | | 81/177.85 |
| 7,437,975 | B1 * | 10/2008 | De Anfrasio | B25B 13/06 |
| | | | | 81/125 |
| 7,765,899 | B2 * | 8/2010 | Nieh | B25B 13/06 |
| | | | | 81/125 |
| 8,726,769 | B1 * | 5/2014 | Jacker | B25B 23/101 |
| | | | | 81/451 |
| 9,598,125 | B2 * | 3/2017 | Hirota | B62D 55/088 |
| 2018/0065236 | A1 * | 3/2018 | Begley | B25C 9/00 |
| 2021/0170556 | A1 * | 6/2021 | Lai | B25B 23/108 |

* cited by examiner

ELASTIC ELEMENT AND HAND TOOL INCLUDING THE SAME

BACKGROUND OF THE INVENTION

1. Technical Field

The present disclosure relates to the provision of an elastic element and more particularly to an elastic element that can be applied to a hand tool.

2. Description of Related Art

In order to operate objects of different sizes, a hand tool is generally used in conjunction with a fastener so that a close fit between the hand tool and an object to be operated can be achieved. Such a fastener is usually compressed and deformed during hand tool operation in order to secure the object in use. Sometimes, however, the object may get stuck because of the material or shape of the fastener and therefore cannot be operated with, or detached from, the hand tool, either of which causes inconvenience to the user. Moreover, the fastener may fail to restore its original shape after excessive deformation such that the service life of the fastener is cut short, which increases the replacement cost.

In light of the above, the provision of a fastener that can effectively enhance the operating efficiency of a hand tool and will not be easily damaged has been an issue to be addressed by those working in the related fields.

BRIEF SUMMARY OF THE INVENTION

The present disclosure provides an elastic element and a hand tool including the same. The elastic element has a groove designed to provide a space that allows deformation of an inner annular wall, thereby making it easier for a user to fit a to-be-operated object securely in the hand tool to enhance work efficiency.

One embodiment of the present disclosure provides an elastic element that includes an inner annular wall, at least one outer annular wall, and a groove. The at least one outer annular wall is connected to the inner annular wall and surrounds the inner annular wall. The groove is formed between the inner annular wall and the at least one outer annular wall.

The foregoing elastic element may be so designed that the number of the at least one outer annular wall is one, that the elastic element has a closed end formed where the inner annular wall and the outer annular wall are connected, and that the groove is provided between the outer annular wall and the inner annular wall in an annular manner. Moreover, the foregoing elastic element may be so designed that the inner annular wall includes at least one protruding portion, and that a height of the inner annular wall that is measured from the closed end to an end portion of the at least one protruding portion is greater than a height of the outer annular wall that is measured from the closed end to an end portion of the outer annular wall.

The foregoing elastic element may be so designed that the outer annular wall has an outer annular wall height, that the end portion of the at least one protruding portion protrudes beyond the end portion of the outer annular wall by a height defined as a protruding portion height, and that the protruding portion height ranges from 0.5 times to 2.5 times the outer annular wall height.

The foregoing elastic element may be so designed that the thickness of the at least one protruding portion is gradually reduced in a direction from the closed end to the end portion of the at least one protruding portion.

The foregoing elastic element may be so designed that the number of the at least one protruding portion is plural, and that the plural protruding portions are arranged at intervals.

The foregoing elastic element may be made of a thermoplastic rubber material.

The foregoing elastic element may be so designed that the number of the at least one outer annular wall is two, and that the two outer annular walls are connected to two ends of the inner annular wall respectively to form the groove.

Another embodiment of the present disclosure provides a hand tool that includes a hand tool body and an elastic element. The hand tool body includes a driving head. The driving head is a hollow structure, has an opening, and includes a furrow in the inner wall of the driving head. The elastic element is provided in the furrow and includes an inner annular wall, at least one outer annular wall, and a groove. The at least one outer annular wall is connected to the inner annular wall and surrounds the inner annular wall. The groove is formed between the inner annular wall and the at least one outer annular wall. The groove has a groove opening, and the groove opening may face a furrow bottom portion of the furrow or face away from the opening of the driving head.

The foregoing hand tool may be so designed that the inner annular wall of the elastic element includes at least one protruding portion, and that when the groove opening of the groove of the elastic element faces away from the opening of the driving head, the at least one protruding portion juts out of the furrow of the driving head.

The foregoing hand tool may be so designed that the number of the at least one protruding portion is plural, and that the plural protruding portions are arranged at intervals. Moreover, the foregoing hand tool may be so designed that the inner wall of the driving head has a plurality of ridges and a plurality of valleys, that the ridges and the valleys are provided in an alternating manner, and that the plural protruding portions correspond to the valleys respectively and jut out of the furrow of the driving head.

DETAILED DESCRIPTION OF THE INVENTION

Figure 1:
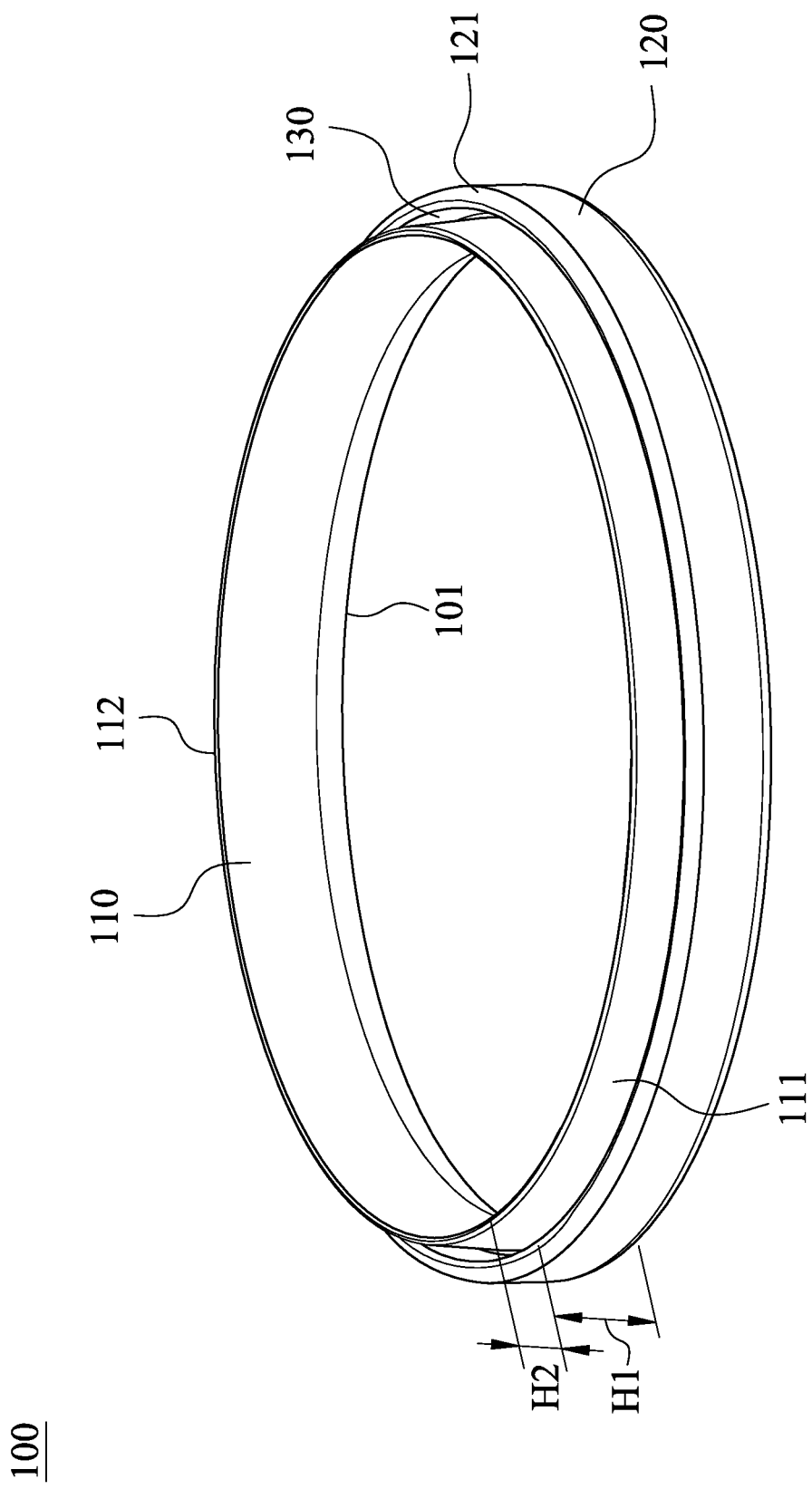
FIG. 1 is a perspective view of the elastic element according to an embodiment of the present disclosure.
Figure 2:
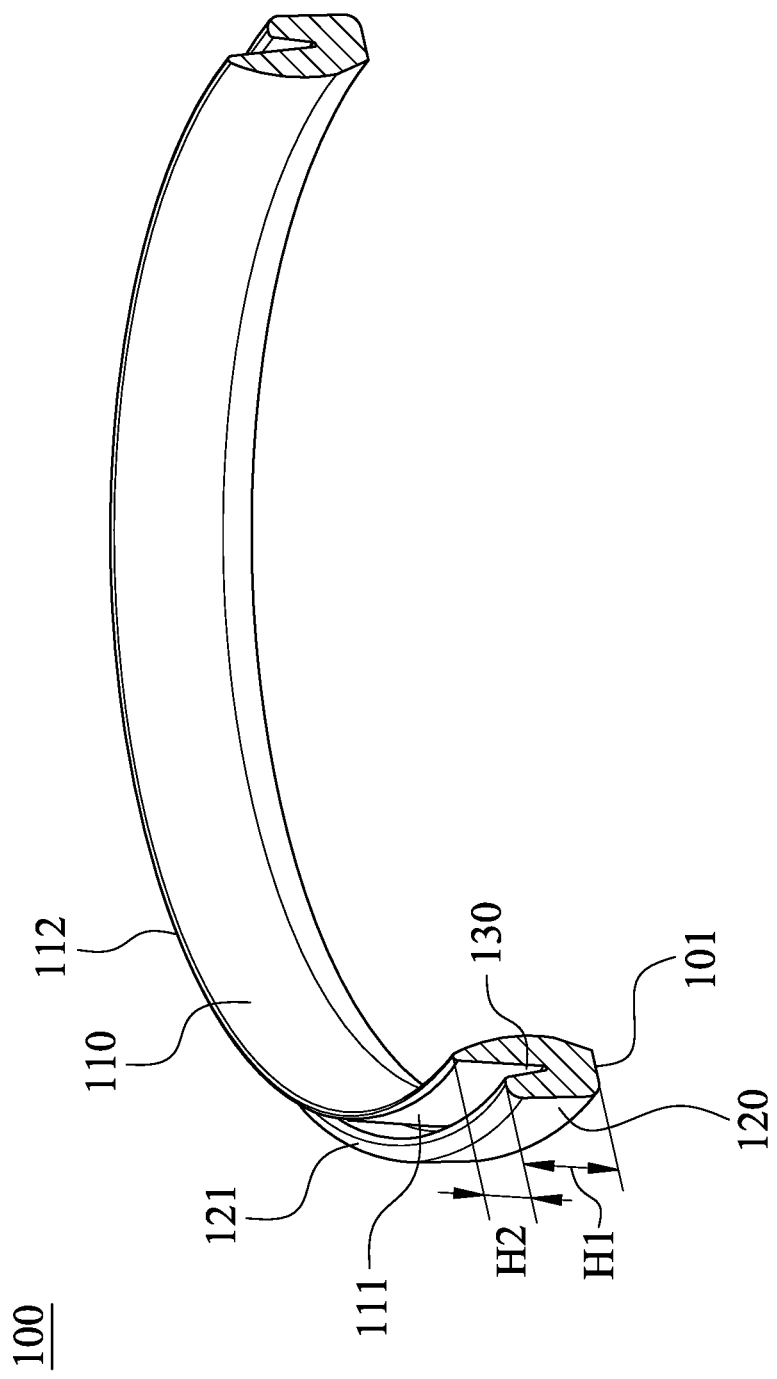
FIG. 2 is a sectional view of the elastic element according to the embodiment in FIG. 1.

Please refer to FIG. 1 for a perspective view of the elastic element 100 according to an embodiment of the present disclosure, and FIG. 2 for a sectional view of the elastic element 100 according to the embodiment in FIG. 1. As shown in FIG. 1 and FIG. 2, the elastic element 100 includes an inner annular wall 110, at least one outer annular wall 120, and a groove 130. The at least one outer annular wall 120 is connected to the inner annular wall 110 and surrounds the inner annular wall 110. The groove 130 is formed between the inner annular wall 110 and the at least one outer annular wall 120. When the elastic element 100 is applied to a hand tool, the groove 130 provides a space that allows the inner annular wall 110 to be deformed, making it easier for a user to fit a to-be-operated object securely in the hand tool to enhance work efficiency.

In the embodiment shown in FIG. 2, the number of the at least one outer annular wall 120 is one, the portion where the inner annular wall 110 and the outer annular wall 120 are connected forms a closed end 101 of the elastic element 100, and the groove 130 is provided between the outer annular wall 120 and the inner annular wall 110 in an annular manner. The inner annular wall 110 includes at least one protruding portion 111, and the height of the inner annular wall 110 that is measured from the closed end 101 to an end portion 112 of the at least one protruding portion 111 is greater than the height of the outer annular wall 120 that is measured from the closed end 101 to an end portion 121 of the outer annular wall 120.

In the embodiment shown in FIG. 2, the number of the at least one protruding portion 111 is one; the present disclosure, however, has no limitation in this regard. Furthermore, the outer annular wall 120 has an outer annular wall height H1, and the end portion 112 of the protruding portion 111 protrudes beyond the end portion 121 of the outer annular wall 120 by a height defined as a protruding portion height H2. The protruding portion height H2 may range from 0.5 times to 2.5 times the outer annular wall height H1; the present disclosure, however, has no limitation on the ratio between the two heights H1 and H2. When the elastic element 100 is applied to a hand tool, not only does the groove 130 provide a space that allows compression or deformation, but also the protruding portion 111 can enhance the closeness of fit of the to-be-operated object in the hand tool, prevent the object from being stuck, and thereby ensure the smoothness and safety of operation of the hand tool.

With continued reference to FIG. 2, the thickness of the protruding portion 111 is gradually reduced in a direction from the closed end 101 to the end portion 112 of the protruding portion 111. When the elastic element 100 is mounted in a hand tool, the protruding portion 111 may be disposed along the inner wall of the hand tool, and when an object is fit into the opening of the driving head of the hand tool in order to be operated by the hand tool, a close fit between the object and the inner wall of the hand tool can be achieved through the protruding portion 111, whose thickness is gradually reduced. In addition, the smoothness with which the object can be driven by the hand tool is enhanced by the groove 130, which allows deformation of the entire inner annular wall 110, and by the change in thickness of the protruding portion 111. The tapered shape of the protruding portion 111 also broadens the application of the hand tool by allowing the hand tool to operate objects of different sizes and shapes.

Moreover, the end portion 112 of the protruding portion 111 may be provided with a curved surface. When an object to be operated is put into a hand tool mounted with the elastic element 100 and compresses the protruding portion 111 in a way that stretches the protruding portion 111 along the inner wall of the hand tool, the curved surface design facilitates stretching of the protruding portion 111 and can prevent the elastic element 100 from irreversible permanent deformation.

The elastic element 100 is made of a thermoplastic rubber (TPR) material; the present disclosure, however, has no limitation in this regard. The use of such a material helps extend the service life of the elastic element 100 by lowering the chance that the elastic element 100 may be permanently deformed after being stretched or compressed. The combination of such a material and the aforesaid structures also helps increase the types of hand tools to which the elastic element 100 can be applied. Furthermore, a thermoplastic rubber material helps reduce the polluting substances generated during manufacture of the elastic element 100 and therefore contributes to alleviating environmental pollution attributable to the manufacturing process.

Figure 3:
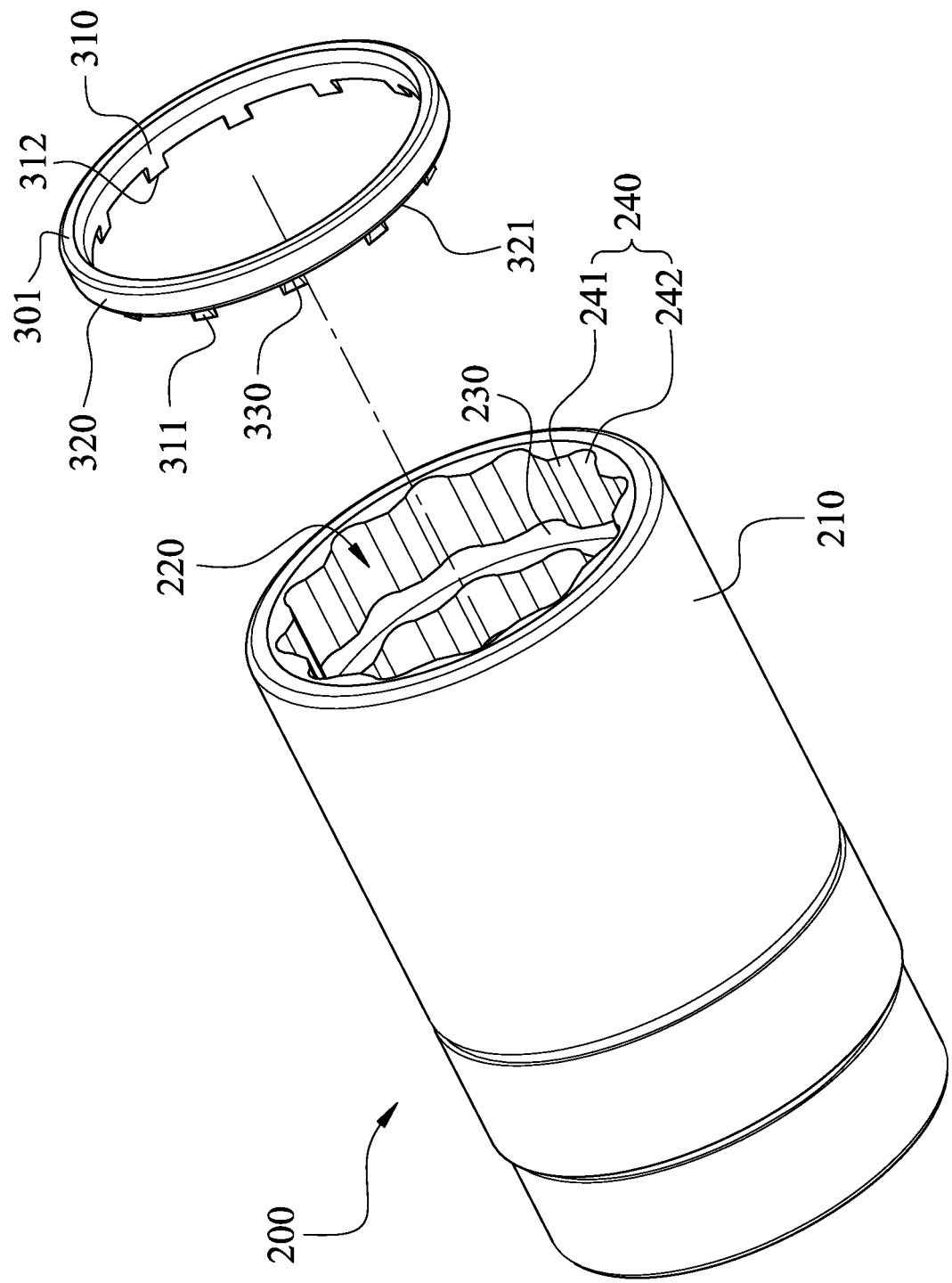
FIG. 3 is a perspective view of the hand tool according to another embodiment of the present disclosure.
Figure 4:
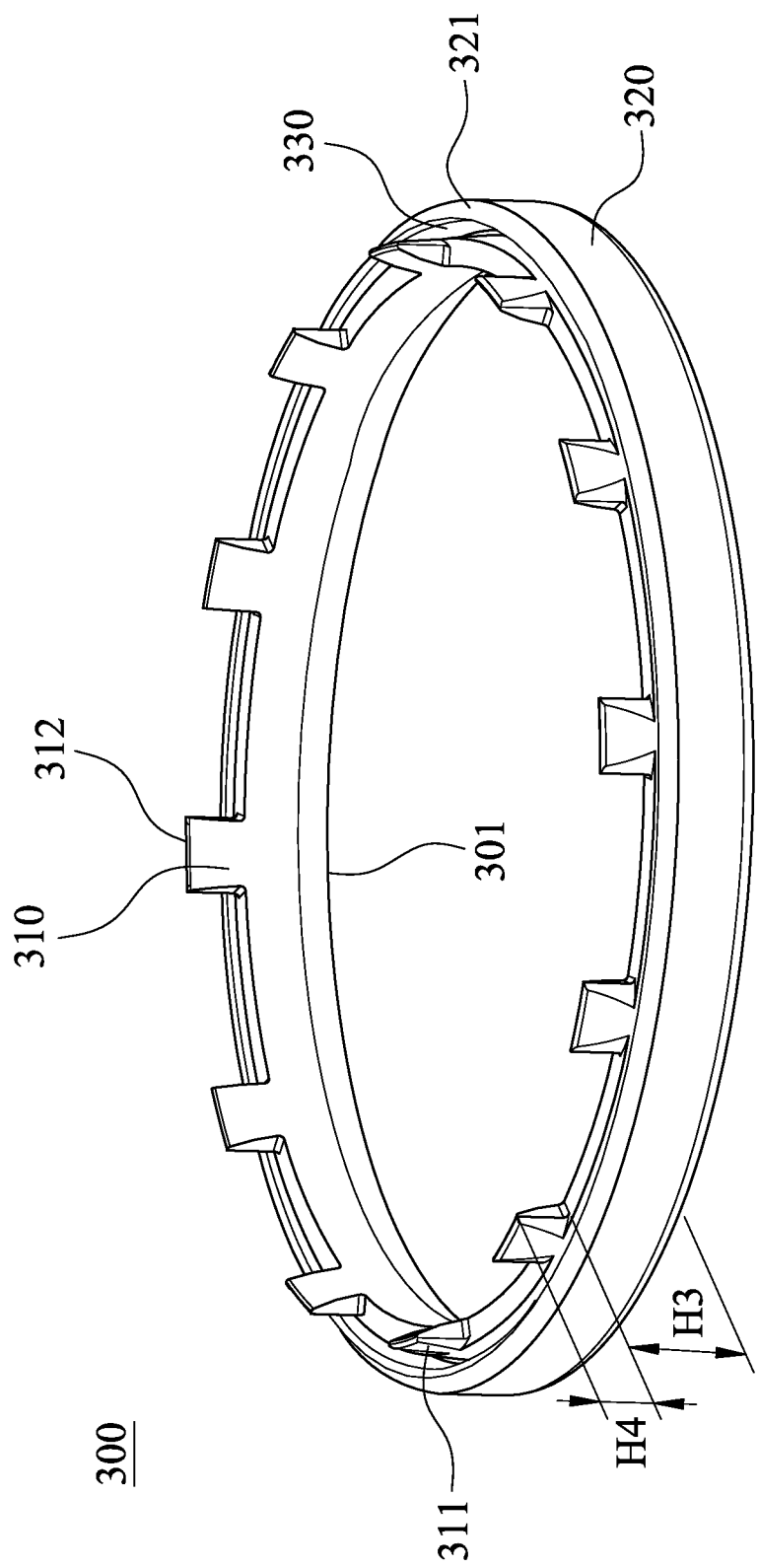
FIG. 4 is a perspective view of the elastic element in the embodiment in FIG. 3.

Please refer to FIG. 3 for a perspective view of the hand tool according to another embodiment of the present disclosure, and FIG. 4 for a perspective view of the elastic element 300 in the embodiment in FIG. 3. As shown in FIG. 3 and FIG. 4, the hand tool includes a hand tool body 200 and the elastic element 300. The hand tool body 200 includes a driving head 210. The driving head 210 is a hollow structure, has an opening 220, and includes a furrow 230 in the inner wall 240 of the driving head 210. The elastic element 300 is provided in the furrow 230 and includes an inner annular wall 310, at least one outer annular wall 320, and a groove 330. The at least one outer annular wall 320 is connected to the inner annular wall 310 and surrounds the inner annular wall 310. The groove 330 is formed between the inner annular wall 310 and the at least one outer annular wall 320. The groove 330 has a groove opening (not indicated by a reference numeral in the drawings), and the groove opening faces away from the opening 220 of the driving head 210. The present disclosure, however, has no limitation on the direction in which the groove opening faces. The inner annular wall 310 and the groove 330 are so designed that when a user fits a to-be-operated object into the hand tool, the groove 330 provides a space that allows the inner annular wall 310 to be deformed. This, in turn, allows the object to be securely fit in the hand tool to enhance work efficiency.

Figure 5:
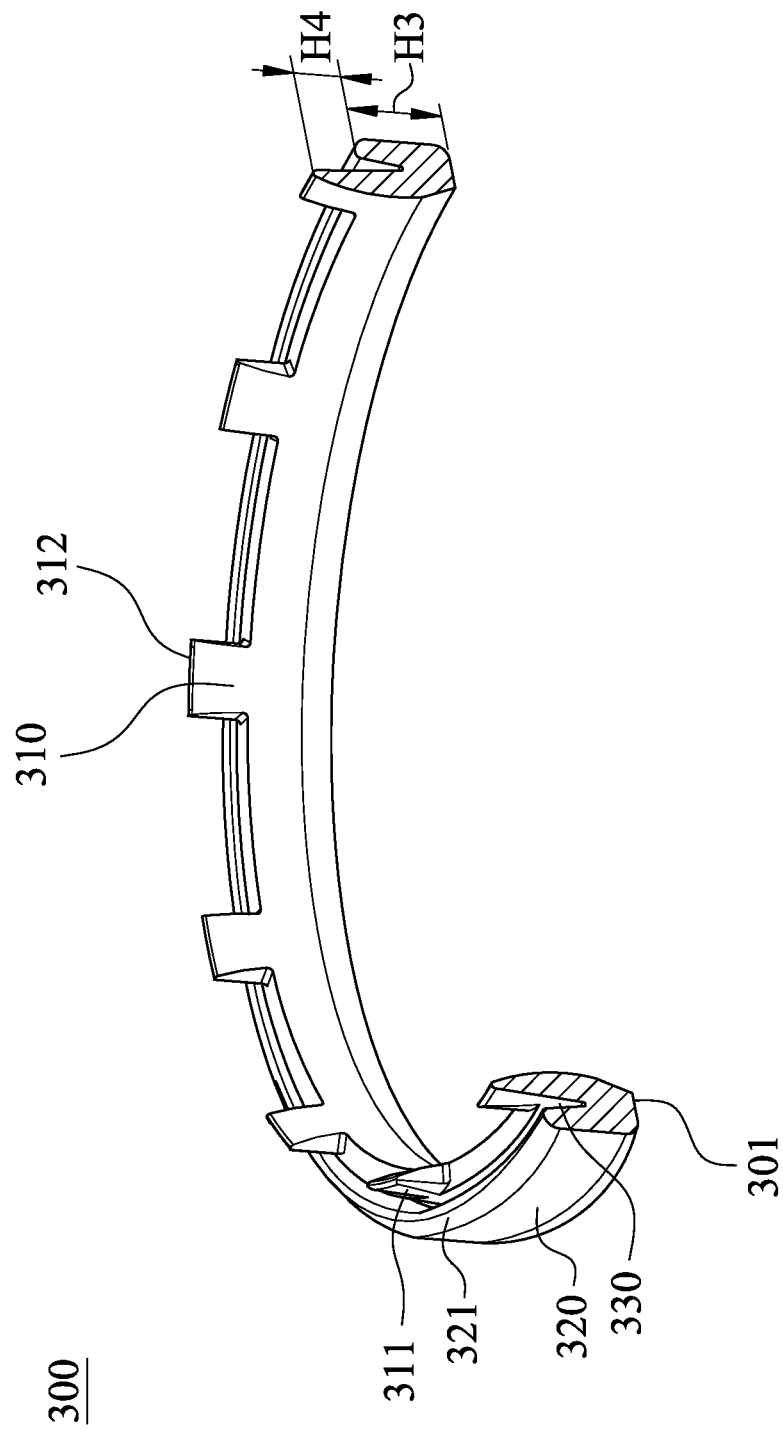
FIG. 5 is a sectional view of the elastic element in FIG. 4.

Please refer to FIG. 5 for a sectional view of the elastic element 300 in FIG. 4. As shown in FIG. 5, the number of the at least one outer annular wall 320 is one, the portion where the inner annular wall 310 and the outer annular wall 320 are connected forms a closed end 301 of the elastic element 300, and the groove 330 is provided between the outer annular wall 320 and the inner annular wall 310 in an annular manner.

Referring to FIG. 4 and FIG. 5, the inner annular wall 310 includes at least one protruding portion 311. When the groove opening of the groove 330 of the elastic element 300 faces away from the opening 220 of the driving head 210, the at least one protruding portion 311 juts out of the furrow 230 of the driving head 210, and the height of the inner annular wall 310 that is measured from the closed end 301 to an end portion 312 of the at least one protruding portion 311 is greater than the height of the outer annular wall 320 that is measured from the closed end 301 to an end portion 321 of the outer annular wall 320. In the embodiment shown in FIG. 4, the number of the at least one protruding portion 311 is plural, and the plural protruding portions 311 are arranged at intervals. More specifically, there are twelve protruding portions 311 in the embodiment shown in FIG. 4. The present disclosure, however, has no limitation on the number of the at least one protruding portion 311.

The outer annular wall 320 has an outer annular wall height H3, and the end portion 312 of each protruding portion 311 protrudes beyond the end portion 321 of the outer annular wall 320 by a height defined as a protruding portion height H4. The protruding portion height H4 may range from 0.5 times to 2.5 times the outer annular wall height H3; the present disclosure, however, has no limitation on the ratio between the two heights H3 and H4. When the elastic element 300 is applied to the hand tool body 200, the groove 330 provides a space that allows compression or deformation, and the protruding portions 311 can enhance the closeness of fit of the to-be-operated object in the hand tool body 200, prevent the object from being stuck, and thereby ensure the smoothness and safety of operation of the hand tool.

As shown in FIG. 5, the thickness of each protruding portion 311 is gradually reduced in a direction from the closed end 301 to the end portion 312 of the protruding portion 311. When the elastic element 300 is mounted in the hand tool body 200, the protruding portions 311 may be disposed along the inner wall 240 of the hand tool body 200, and when an object is fit into the opening 220 of the driving head 210 of the hand tool body 200 in order to be operated by the hand tool, a close fit between the object and the inner wall 240 of the hand tool body 200 can be achieved through the protruding portions 311, whose thickness is gradually reduced. In addition, the smoothness with which the object can be driven by the hand tool is enhanced by the groove 330, which allows deformation of the entire inner annular wall 310, and by the change in thickness of the protruding portions 311. The tapered shape of the protruding portions 311 also broadens the application of the hand tool by allowing the hand tool to operate objects of different sizes and shapes.

Moreover, the end portion 312 of each protruding portion 311 may be provided with a curved surface. When an object to be operated is put into the hand tool body 200 and compresses the protruding portions 311 in a way that stretches the protruding portions 311 along the inner wall 240 of the hand tool body 200, the curved surface design facilitates stretching of the protruding portions 311 and can prevent the elastic element 300 from irreversible permanent deformation.

Figure 6:
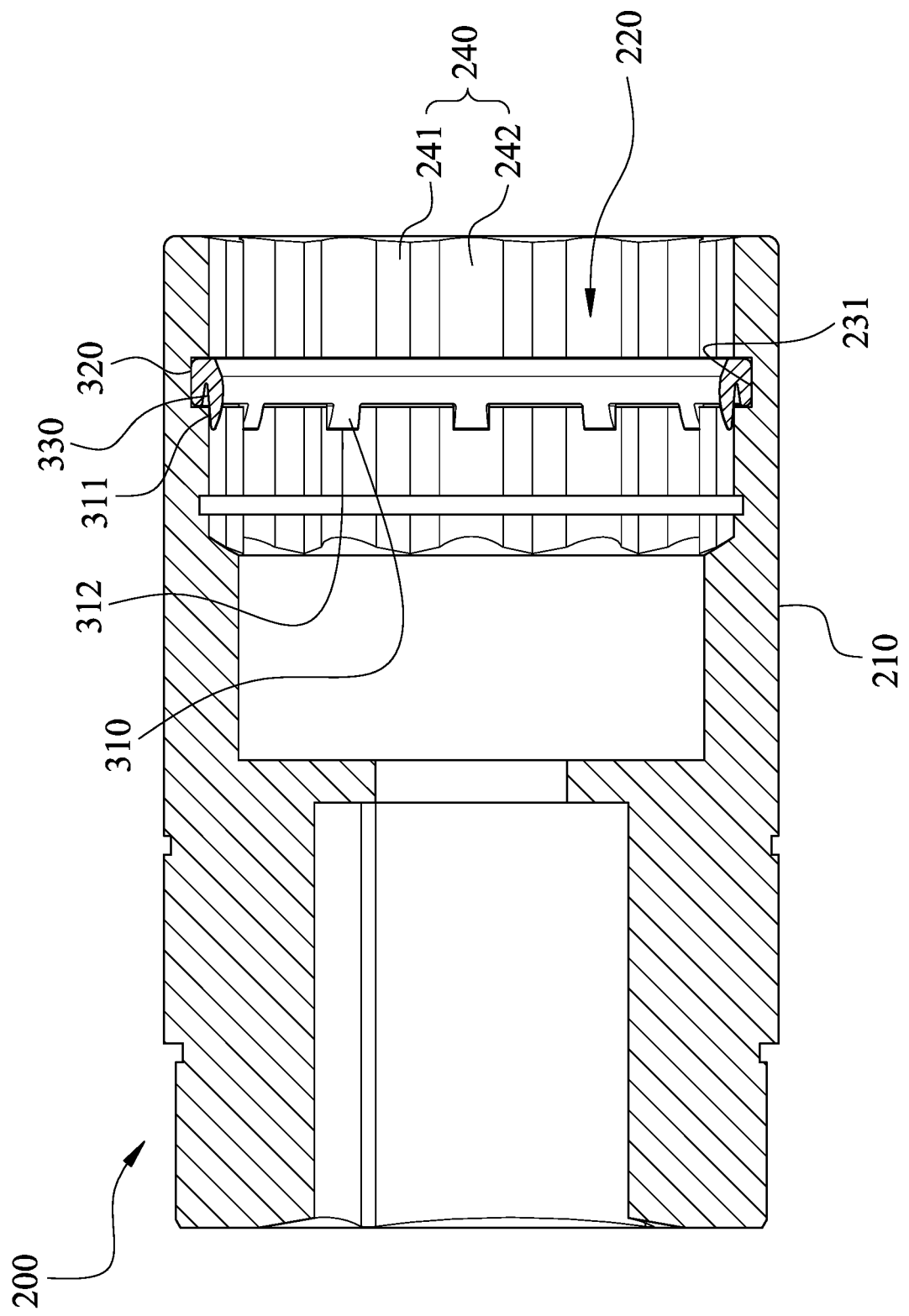
FIG. 6 is a sectional view of the hand tool according to the embodiment in FIG. 3.

Please refer to FIG. 6 for a sectional view of the hand tool according to the embodiment in FIG. 3. As shown in FIG. 6, the inner wall 240 of the driving head 210 has a plurality of ridges 241 and a plurality of valleys 242. The ridges 241 and the valleys 242 are provided in an alternating manner. The protruding portions 311 correspond to the valleys 242 respectively and jut out of the furrow 230 of the driving head 210. The alternating design of the ridges 241 and valleys 242 of the inner wall 240 allows an object to engage with, and be securely fit among, the ridges 241 of the inner wall 240 of the hand tool, thereby increasing the stability with which the hand tool can be operated. Furthermore, when an object is fit into the opening 220 of the driving head 210 of the hand tool body 210 in order to be operated by the hand tool, the protruding portions 311, which correspond to the valleys 242 respectively and jut out of the furrow 230 of the driving head 210, can be stretched along the valleys 242 of the inner wall 240 respectively. This not only prevents the elastic element 300 from being permanently deformed, but also allows the object to be securely fit among the valleys 242 of the inner wall 240 to enhance the stability of operation of the hand tool.

The elastic element 300 is made of a thermoplastic rubber material, and yet the present disclosure has no limitation in this regard.

Figure 7:
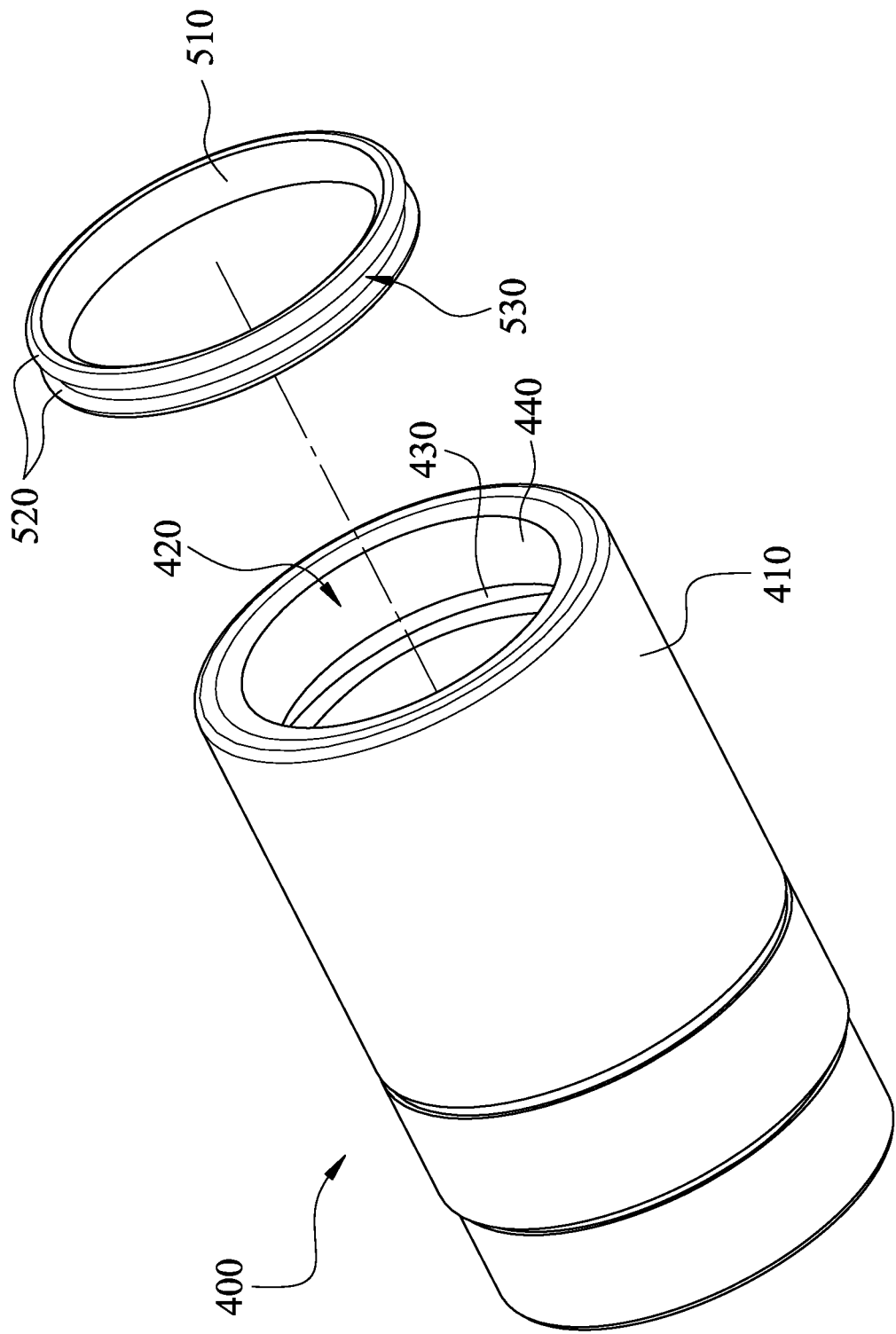
FIG. 7 is a perspective view of the hand tool according to yet another embodiment of the present disclosure.
Figure 8:
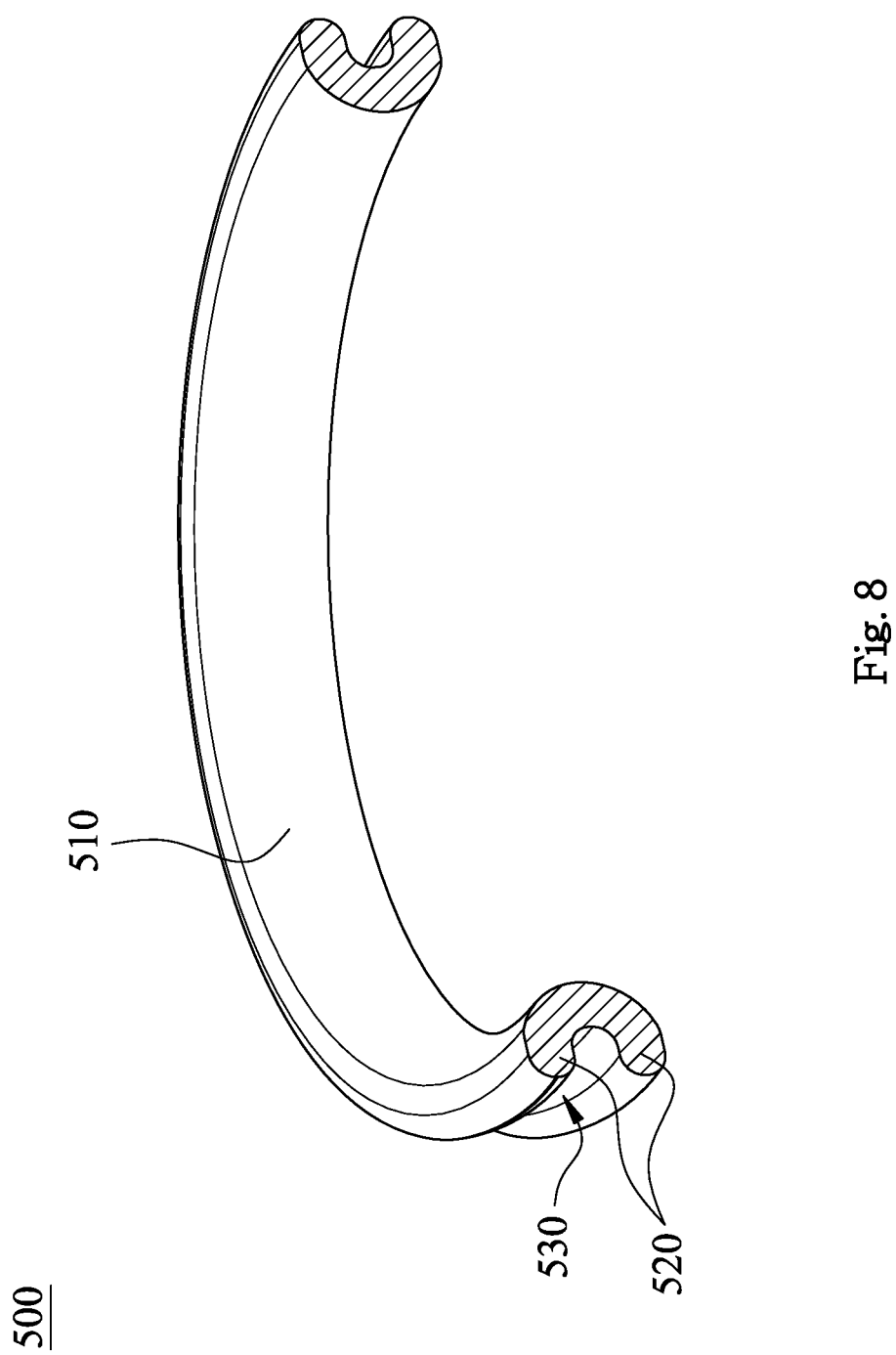
FIG. 8 is a sectional view of the elastic element in the embodiment in FIG. 7.

Please refer to FIG. 7 for a perspective view of the hand tool according to yet another embodiment of the present disclosure, and FIG. 8 for a sectional view of the elastic element 500 in the embodiment in FIG. 7. As shown in FIG. 7 and FIG. 8, the hand tool includes a hand tool body 400 and the elastic element 500. The hand tool body 400 includes a driving head 410. The driving head 410 is a hollow structure, has an opening 420, and includes a furrow 430 in the inner wall 440 of the driving head 410. The elastic element 500 is applied to the hand tool and includes an inner annular wall 510, at least one outer annular wall 520, and a groove 530. The at least one outer annular wall 520 is connected to the inner annular wall 510 and surrounds the inner annular wall 510. The groove 530 is formed between the inner annular wall 510 and the at least one outer annular wall 520. More specifically, the elastic element 500 is provided in the furrow 430 of the driving head 410, and the groove 530 has a groove opening (not indicated by a reference numeral in the drawings) that faces a furrow bottom portion (not indicated by a reference numeral in the drawings) of the furrow 430.

The number of the at least one outer annular wall 520 is two, and the two outer annular walls 520 are connected to two ends of the inner annular wall 510 respectively to form the groove 530. The groove 530 is designed to provide a space that allows the inner annular wall 510 to be deformed when an object to be operated is fit into the hand tool, thereby allowing the object to be securely fit in the hand tool to enhance work efficiency.

Figure 9:
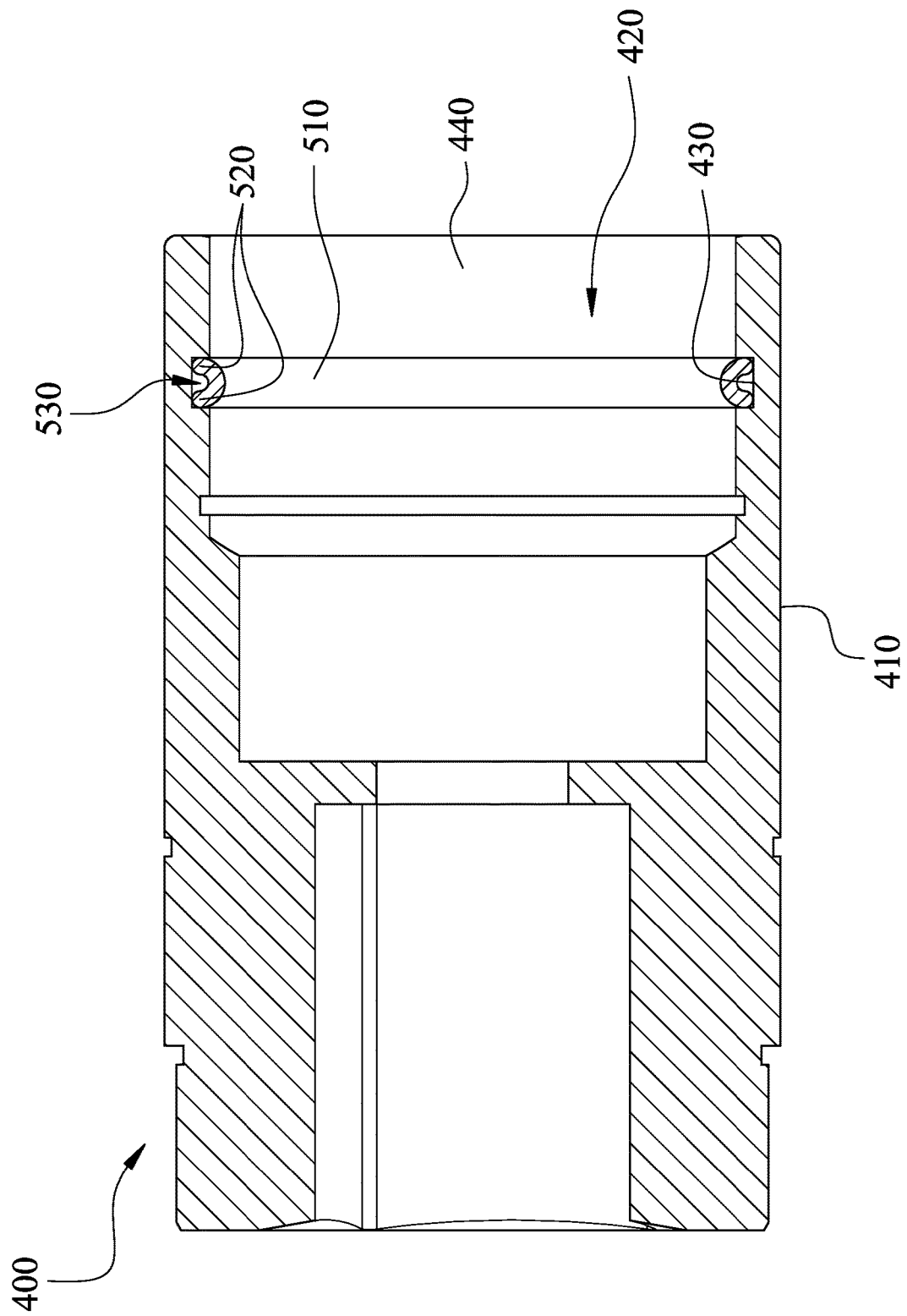
FIG. 9 is a sectional view of the hand tool according to the embodiment in FIG. 7.

Please refer to FIG. 9 for a sectional view of the hand tool according to the embodiment in FIG. 7. When the elastic element 500 is mounted in the furrow 430 of the hand tool body 400 as shown in FIG. 9, and an object to be operated is put into the hand tool body 400 through the opening 420 of the driving head 410 of the hand tool body 400, the groove 530 provides a space that allows deformation of the elastic element 500, or more particularly deformation of the inner annular wall 510 toward the furrow bottom portion of the furrow 430 when the inner annular wall 510 pressed, lest the elastic element 500 be permanently deformed after long-term use. This helps extend the service life of the elastic element 500.

The elastic element 500 is made of a thermoplastic rubber material, and yet the present disclosure has no limitation in this regard.

While the present disclosure makes reference to the foregoing embodiments, those embodiments are not intended to be restrictive of the scope of the present disclosure. A person of ordinary skill in the art would be able to change or modify the embodiments slightly without departing from the spirit or scope of the present disclosure. The scope of the patent protection sought by the applicant is defined by the appended claims.

What is claimed is:
1. An elastic element, comprising:
an inner annular wall;
an outer annular wall connected to and surrounding the inner annular wall; and
a groove formed between the inner annular wall and the at least one outer annular wall;
wherein the elastic element has a closed end formed where the inner annular wall and the outer annular wall are connected, and the groove is provided between the outer annular wall and the inner annular wall in an annular manner;

the inner annular wall comprises at least one protruding portion, the inner annular wall has a height measured from the closed end to an end portion of the at least one protruding portion, the outer annular wall has a height measured from the closed end to an end portion of the outer annular wall, and the height of the inner annular wall is greater than the height of the outer annular wall.

2. The elastic element of claim 1, wherein the outer annular wall has an outer annular wall height, the end portion of the at least one protruding portion protrudes beyond the end portion of the outer annular wall by a height defined as a protruding portion height, and the protruding portion height ranges from 0.5 times to 2.5 times the outer annular wall height.

3. The elastic element of claim 1, wherein the at least one protruding portion has a thickness gradually reduced in a direction from the closed end to the end portion of the at least one protruding portion.

4. The elastic element of claim 1, wherein the number of the at least one protruding portion is plural, and the plural protruding portions are arranged at intervals.

5. The elastic element of claim 1, wherein the elastic element is made of a thermoplastic rubber material.

6. The elastic element of claim 1, wherein the number of the at least one outer annular wall is two, and the two outer annular walls are connected to two ends of the inner annular wall respectively to form the groove.

7. A hand tool, comprising:
a hand tool body comprising:
  a driving head configured as a hollow structure, having an opening, and comprising a furrow in an inner wall of the driving head; and
  an elastic element provided in the furrow and comprising:
    an inner annular wall;
    at least one outer annular wall connected to and surrounding the inner annular wall; and
    a groove formed between the inner annular wall and the at least one outer annular wall;
wherein the groove has a groove opening, and the groove opening faces a furrow bottom portion of the furrow or faces away from the opening of the driving head; and
the inner annular wall of the elastic element comprises at least one protruding portion, wherein when the groove opening of the groove of the elastic element faces away from the opening of the driving head, the at least one protruding portion juts out of the furrow of the driving head.

8. The hand tool of claim 7, wherein the number of the at least one protruding portion is plural, and the plural protruding portions are arranged at intervals; and wherein the inner wall of the driving head has a plurality of ridges and a plurality of valleys, the ridges and the valleys are provided in an alternating manner, and the protruding portions correspond to the valleys respectively and jut out of the furrow of the driving head.

* * * * *